United States Patent Office 3,506,701
Patented Apr. 14, 1970

3,506,701
URIEDO SUBSTITUTED ORGANOSILANES
Joel Francis Di Paola, Danbury, Conn., assignor to General Electric Company, a corporation of New York
No Drawing. Filed Aug. 9, 1967, Ser. No. 659,293
Int. Cl. C07f 7/04, 7/10, 7/18
U.S. Cl. 260—448.2     10 Claims

ABSTRACT OF THE DISCLOSURE

Uriedo substituted organosilicon materials, such as bis(N,N-dimethyl-N'-allyl - uriedo)dimethylsilane, tris(N,N-dimethyl-N'-methyluriedo)methylsilane, etc., are made by effecting reaction between the corresponding aminosilane and organoisocyanate as illustrated by the equation,

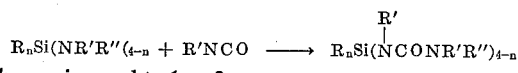

where $n$ is equal to 1 or 2.

The subject uriedo substituted organosilicon materials can be employed with various silanol-containing organosilicon materials to provide for the production of organosilicon polymers and block copolymers and room temperature vulcanizing organopolysiloxane compositions.

---

The present invention relates to uriedo-substituted organosilicon materials such as certain uriedo substituted silanes and bis(uriedosilyl)hydrocarbons and to their use in making organosilicon polymers.

The uriedo substituted organosilicon materials included by the present invention are selected from uriedosilanes of the formula:

(1)   

and bis(uriedosilyl)hydrocarbons of the formula:

(2)   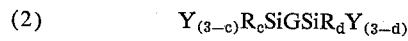

where R is a member selected from the class consisting of monovalent hydrocarbon radicals, halogenated monovalent hydrocarbon radicals, and cyanoalkyl radicals, R' is a member selected from monovalent hydrocarbon radicals and halogenated monovalent hydrocarbon radicals, R'' is a member selected from hydrogen and R' radicals, R''' is a member selected from hydrogen and alkoxy radicals, Y is a uriedo radical of the formula

G is a divalent hydrocarbon radical, $a$ is a whole number equal to 0 to 2 inclusive, $b$ is a whole number equal to 0 to 1, and the sum of $a$ and $b$ is equal to 1 or 2, $c$ is a whole number equal to 0 to 2 inclusive, $d$ is a whole number equal to 0 to 2 inclusive, and the sum of $c$ and $d$ is equal to 0 to 4 inclusive. Radicals included by R of Formula 1, are for example, aryl radicals and halogenated aryl radicals, such as phenyl, chlorophenyl, xylyl, tolyl, etc.; aralkyl radicals, such as phenylethyl, benzyl, etc.; aliphatic radicals, haloaliphatic radicals, and cycloaliphatic radicals, such as alkyl, alkenyl, cycloalkyl, haloalkyl, for example, methyl, ethyl, propyl, trifluoropropyl, chlorobutyl, etc.; vinyl, allyl, etc.; cyclohexenyl, etc.; cyanoalkyl radicals, such as cyanoethyl, cyanopropyl, etc. Radicals included by R' are all of the aforementioned R radicals except cyanoalkyl radicals. Radicals included by R'' are hydrogen and R' radicals. Radicals included by R''' are hydrogen and alkoxy radicals, such as methoxy, ethoxy, propoxy, butoxy, tert-butoxy, etc. Radicals included by G are, for example, methylene, ethylene, trimethylene, butylene, phenylene, xylylene, naphthalene, etc. Radicals included by Y, are for example, N,N-dimethyl - N' - methyluriedo, N,N,-methylisopropyl-N'-phenyluriedo, N,N - diethyl-N'-methyluriedo, N,N - methylethyl-N'-phenyluriedo, N,N-dimethyl-N'-allyluriedo, N,N-diethyl-N'-phenyluriedo, etc. In the above formula where R, R', R'', G, and Y can represent more than one radical respectively, these radicals can be all the same or any two or more of the aforementioned radicals.

The uriedo substituted organosilicon materials of the present invention can be viscous liquids or waxy solids. They can be made by effecting contact between certain organosilylamines and organoisocyanate, as shown by the following equation, (3)   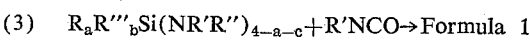

Bis(uriedosilyl)hydrocarbons of Formula 2, can be made by a similar procedure by contacting bis(aminosilyl)hydrocarbons and organoisocyanate, as shown by the following (4)   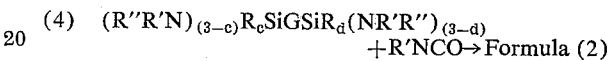
   $+R'NCO \rightarrow$ Formula (2)

where all of the terms shown in Equation 3 and Equation 4, are as previously defined.

Included by the uriedosilanes of Formula 1, are for example, bis(N,N - dimethyl-N'-allyluriedo)dimethylsilane, tris(N-isopropyl-N'-allyluriedo)methylsilane, tris(N,N-dimethyl - N' - methyluriedo)ethylsilane, bis(N,N-dimethyl-N'-methyluriedo)dimethylsilane, bis(N,N-dimethyl-N'-methyluriedo)methylvinylsilane, tris(N,N-dimethyl-N'-phenyluriedo)methylsilane, is(N,N-diethyl-N'-methyluriedo)methylsilane, tris(N,N-dimethyl-N'-methyluriedo)silane, tris(N,N-dimethyl-N'-methyluriedo)tert-butoxysilane, tris(N-isopropyl-N'-allyluriedo)phenylsilane, etc.

Included by the bis(uriedosilyl)hydrocarbons of Formula 2, are for example, bis[(N,N-dimethyl-N'-methyluriedo)dimethylsilyl]methane, 1,3 - bis[tris(N,N-dimethyl-N'-methyluriedo)silyl]propane, 1,4 - [(N-isopropyl-N'-alyluriedo)dimethylsilyl]benzene, 1,4-bis[N,N-dimethyl-N'-methyluriedo)dimethylsilyl]benzene, 1,4-bis[bis(N,N-dimethyl-N'-methyluriedo)methylsilyl]benzene, etc.

As shown by Equations 3 and 4, the uriedo substituted organosilicon materials can be made by contacting under substantially anhydrous conditions, organosilylamines, or bis(aminosilyl)hydrocarbons with organoisocyanate. Temperatures in the range of between 0° C. to 100° C. can be employed, and preferably temperatures between 25° C. and 50° C. Organic solvent can be utilized to moderate reaction rates and facilitate contact between reactants. In particular instances, external cooling may be required. Suitable are any organic solvents which are substantially inert to the reactants during reaction and organic solvents include for example, ethers such as ethylether, tetrahydrofuran, dioxane, etc. Some of the organosilylamines which can be utilized with organoisocyanate, as shown in Equation 3, can be made by the method described in Patent 2,429,883—Johannson. The bis(aminosilyl)hydrocarbons of Equation 4 can be made by effecting contact under substantially anhydrous conditions between the corresponding bis(halosilyl)hydrocarbon, and appropriate primary or secondary amine in the presence of an acid acceptor such as pyridine. Some bis(halosilyl)hydrocarbons and method of making them, are shown for example, by Sveda Patent 2,561,429. Uriedo substituted organosilicon material, can be recovered from the organoisocyanate and amino substituted organosilicon material reaction mixture, by stripping the reaction mixture of solvents under reduced pressure. The employment of a stoichiometric amount of organoisocyanate with ether the organosilylamine, or bis(aminosilyl)hydrocarbon, will facilitate recovery of the uriedo-substituted organosilicon material. Experience has shown that recovery of the desired product can be effected readily by stripping the reaction mixture to a constant weight.

As previously indicated, the uriedo substituted organosilicon materials of Formulas 1 and 2 can be employed in combination with various silanol-containing organosilicon materials, such as silanol-terminated organopolysiloxane consisting essentially of chemically combined diorganosiloxy units of the formula:

(5)  $R_2SiO$ silanol-terminated organosilicon polymers consisting essentially of chemically combined silhydrocarbylsiloxy units:

(6)  $R_2SiG(R)_2SiO$ units and polymer consisting essentially of mixtures of chemically combined units of Formulas 5 and 6, where R and G are as previously defined, to provide for the production of higher molecular weight organosilicon polymers. For example, as shown in my copending application 659,307, now U.S. Patent, 3,385,823, filed concurrently herewith, and assigned to the same assignee as the present invention, certain tris(uriedo)organosilanes included by $QSiY_3$, where Y is as previously defined, and Q is selected from hydrogen, monovalent hydrocarbon radicals, halogenated monovalent hydrocarbon radicals, cyanoalkyl radicals, and alkoxy radicals, can be employed in combination with silanol-containing organosilicon material consisting essentially of units of Formula 5, to provide for the production of room temperature vulcanizing organopolysiloxane compositions. Also included by Formulas 1 and 2 are bis(uriedo)diorganosilane, $$R_eR'''_fSiY_2$$

and bis(uriedo)diorganosilylhydrocarbons, $[YR_2Si]_2G$, where $e$ is equal to 1 or 2, $f$ is equal to 0 to 1, and the sum of $e$ and $f$ is equal to 2. These uriedo substituted organosilicon materials can be utilized to effect molecular weight build-up of various silanol-containing organosilicon materials consisting essentially of units of Formula 5, Formula 6, and mixtures thereof.

Condensation between uriedo substituted organosilicon material and silanol-containing organosilicon material can result in the production of a new siloxane linkage and a substituted urea, as shown by the following equation:

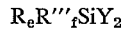
$$\equiv SiY + HOSi O \longrightarrow \equiv SiOSiO + Y(H)$$

where Y and R are as previously defined, and Y(H) can be a substituted urea.

The method of the present invention further provides for the production of block copolymers as a result of contact between Y radicals attached to silicon and OH radicals attached to silicon. For example, contact between uriedo substituted organosilicon materials, such as $R_2SiY_2$ and $[YR_2Si]_2G$, and silanol-terminated polymers consisting essentially of chemically combined units of Formula 5, can provide for block copolymers having the following average formulas:

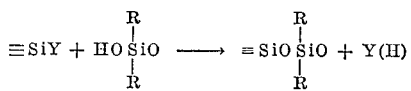

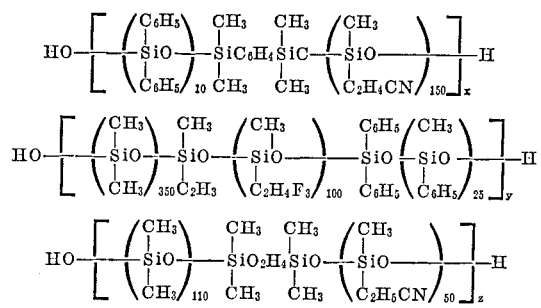

etc.
where $x$, $y$ and $z$ are positive integers.

A significant feature of the present invention is that the by-product of condensation reaction is a substantially odorless urea, or substituted urea. In addition to being odor free, the urea by-product can be left in the polymer without adverse results, or it can be readily removed by solvent extraction or stripping at temperatures in the range of between 100° C. to 150° C. Since stripping at temperatures between 100° C. to 150° C. is normally employed during the production of organopolysiloxanes by prior art equilibration methods, the method of the present invention has a further advantage. Organosilicon polymers can be made utilizing standard equilibration conditions without a subsequent decatalyzing step. As taught in Boot Patent 3,153,057, assigned to the same assignee as the present invention, decatalyzing the polymer is generally necessary to remove equilibration catalyst. In addition, organopolysiloxane polymers, for example, gums, made by the method of the present invention, are substantially free of low molecular weight volatiles.

In accordance with the practice of the invention, there is provided a method which comprises (1) effecting contact at a temperature between 0° C. to 200° C. between (A) a silanol-containing organosilicon material and (B) a uriedo-substituted organosilicon material and (2) separating from the product of (1) an organosilicon polymer having a molecular-weight greater than (A) or (B), where (A) is a member selected from (a) An organosilicon material having terminal silanol radicals selected from
 (i) polymer consisting essentially of chemically combined units of Formula 5,
 (ii) polymer consisting essentially of units of Formula 6,
 (iii) polymer consisting essentially of (i) units chemically combined with (ii) units, and
(b) An organosilicon material having terminal units of the formula:
(7) 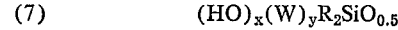 $(HO)_x(W)_yR_2SiO_{0.5}$ selected from,
 (iv) polymer consisting essentially of chemically combined (i) units, and
 (v) polymer consisting essentially of (i) units chemically combined with (ii) units, and (B) is a urieido-substitute organosilicon material of the formula:

(8)  $YR_2SiZ$ where Z is a member selected from Y, $GSiR_2Y$, $(OSiR_2)_r OSiR_2Y$ and $GSiR_2(OSiGSiR_2)_qY$, and a monovalent group consisting essentially of chemically combined (i) units and (ii) units of (A) having a terminal Y radical, where R, G, and Y are as previously defined, W is a member selected from R and $GSiR_3$, $q$ is an integer equal to from 1 to 50 inclusive, $r$ is an integer equal to from 5 to 1500 inclusive, $x$ has a value between 0.5 to 0.99, and $y$ has a value between .01 to 0.5.

Methods for making silanol-terminated organopolysiloxanes consisting essentially of units of Formula 5, are well known and include for example, procedures involving the hydrolysis of diorganodihalosilane, such as dimethyldichlorosilane, diphenyldichlorosilane, etc., or the equilibration of cyclopolydiorganopolysiloxane, such as octamethylcyclotetrasiloxane, etc. The resulting organopolysiloxanes can be reverted to lower molecular weight silanol-terminated polydiorgansiloxane by the employment of controlled amounts of water until the desired viscosity is achieved. Silanol-terminated diorganopolysiloxanes useful in the practice of the present invention, can have viscosities between 200 to 50,000 centipoises at 25° C. Methods for making silanol-terminated organosilicon polymers, including polymers and copolymers having chemically combined units of Formula 6 are for example, illustrated by Nielson Patent 3,135,777 assigned to the same assignee as the present invention. Additional methods are shown by Sveda Patent 2,561,429. Silanol-terminated organosilicon materials having chemically combined units of Formula 5 and Formula 6, can have viscosities ranging from fluids to waxy materials depending upon the mole percent of the units of Formula 6. Preferably, the silylhydrocarbonsiloxy containing polymers have from 5 to 25 mole percent of chemically combined units of Formula 6. Included by the silanol-terminated organopolysiloxanes consisting essentially of chemically combined units of Formula 5 are polymers of the formula:

(9)
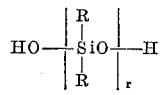

where R and r are as previously defined. For example, these silanol-terminated polymers can consist essentially of chemically combined dimethylsiloxy units, copolymers of dimethylsiloxy units with one or more units such as methylcyanoethylsiloxy units, methylphenylsiloxy units, diphenylsiloxy units, methyltrifluoropropylsiloxy units, etc.

In certain situations, for example, where organopolysiloxane gums are desired having terminal units of Formula 7, there is preferably utilized in combination with uriedo-substituted organosilicon material included by Formula 8, silanol-containing organosilicon material consisting essentially of a mixture of organosilicon material of the formula:

(10)     $R(R_2SiO)_sH$ and silanol-terminated organopolysiloxanes of Formula 9, where $s$ is an integer equal to 3 to 1000 inclusive. Organosilicon material of Formula 10 can be utilized in amounts sufficient to provide for gums having ratios of the sum of R radicals to silicon of from about 1.95 to 2.001. The organosilicon materials of Formula 10 can be made by equilibrating a mixture of from .01 to 20 mole percent of $R_3SiO_{0.5}$ units, and from 80 mole percent to 99.9 mole percent of units of Formula 5. Organosilicon material of Formula 10 can contain from 0.02 to 8 percent by weight of hydroxy radicals attached to silicon and can have viscosities up to 50,000 centipoises at 25° C.

In the practice of the method of the percent invention, the organosilicon polymers resulting from contact between silanol-containing organosilicon material and uriedo-substituted organosilicon material, such as the above shown block copolymers, are preferably made at temperatures between 20° C. to 170° C.

The order of addition of the respective reactants is not critical. For example, in instances where a bis-uriedosilane included by Formula 1, or a bis(uriedo-silyl)hydrocarbon of Formula 2 is utilized in combination with organosilicon material having terminal units of Formula 7, such as organosilicon material of Formula 10, it is preferred to add bis(uriedo)organosilicon material to the silanol-containing organosilicon material. An alternate procedure, is to utilize a silane of the formula:

(11)     $R_3SiX$ where R is as previously defined, X is a hydrolyzable radical such as Y, to provide for the direct production of terminal units of Formula 7 in the reaction mixture. In this situation, the "monofunctional silane" of Formula 11 can be utilized in combination with the bis(uriedo)organosilicon material to provide for organosilicon polymers, such as fluids, or gums, which may be block copolymers having terminal chain-stopping units. The amount of bis(uriedo)organosilicon material utilized in combination with either the monofunctional silane, or materials of Formula 10, can vary widely, depending upon the molecular weight of the organosilicon polymer, or the particular ratio of the sum of R radicals to silicon desired. Fluid organosilicon polymers or copolymers made in accordance with the method of the invention generally can have a ratio of the sum of R radicals to silicon of greater than 2, such as between 2.01 to 2.4. Gums can have a ratio to silicon of between about 1.95 to 2.01, allowing for the presence of a minor amount of trifunctional units such as $RSiO_{1.5}$, for example, phenylsiloxy, methylsiloxy, etc.

It is preferred to practice the method of the invention under substantially anhydrous conditions to preclude any undue hydrolysis of Y radicals which, hereinafter will represent uriedo radicals, as distinguished from silanol radicals which are hydroxy radicals attached to silicon. In instances where substantially anhydrous conditions are employed, rapid addition of excess uriedo-substituted organosilicon material can impede further intercondensation. However, the introduction of moisture will provide for further intercondensation by creating further silanol due to the hydrolysis of terminal Y radicals. In instances where low molecular weight organosilicon polymer is desired, an organic solvent can be optionally employed. In most instances, it is preferred to work in the absence of an organic solvent. In order to facilitate stirring, however, where it is desired to make high molecular weight organosilicon materials, minor amounts of an inert organic solvent such as less than 10 percent by weight of the reaction mixture, can be introduced after intercondensation has substantially progressed. Suitable organic solvents are, for example, benzene, xylene, toluent, etc. In instances where the uriedo-organosilicon material is utilized in amounts sufficient to provide for up to at least one Y radical, per silanol radical of the silanol-containing organosilicon material, it has been found that unreacted silanol generally remains. Excess of uriedo-substituted organosilicon material beyond that quantity required to effect intercondensation of silanol with Y radicals, such as in amounts sufficient to provide for from 1 to 5 Y radicals per silanol radical, can be employed without adverse results.

Reactions are generally most conveniently performed at atmospheric pressure. However, pressures below atmospheric can be utilized. Recovery of the desired polymer can be readily achieved by allowing the mixture to increase in viscosity and then removing volatiles, including by-products at reduced pressure, whenever the desired viscosity is achieved.

In order that those skilled in the art will be better able to practice the invention, the following examples are given by way of illustration and not by way of limitation. All parts are by weight.

EXAMPLE 1

There was added 17.5 parts of tris(dimethylamino)-methylsilane dissolved in 42 parts of ether to 33.2 parts of allylisocyanate dissolved in an equal weight of ether. During the addition, the temperature rose from 31° C. to 430 C. A clear yellow solution was obtained. The mixture was stripped of ether and allylisocyanate to produce 48.4 parts of product. An infra-red spectrum of the product showed it was free of isocyanate. Based on method of preparation, the product as tris(N,N-dimethyl-N'-allyluriedo)methylsilane. Its identity was confirmed by elemental analysis as follows. Theor. (percent): carbon 53.75; hydrogen 8.5; silicon 6.64; nitrogen 19.8. Found (percent): carbon 53.75; hydrogen 8.23; silicon 6.21; nitrogen 18.83.

EXAMPLE 2

There was added at a temperature between 20° C. and 28° C., 16.8 parts of tris(dimethylamino)methylsilane dissolved in 35 parts of ether to 22.8 parts of methylisocyanate dissolved in an equal weight of ether. After the addition, the ether was flash evaporated utilizing reduced pressure at a temperature between 17° C. to 20° C. The crule product was then further stripped for a period of 24 hours at a temperature between 40° C. and 72° C. and a pressure between 0.075 mm. to 0.5 mm. Hg. There was obtained 32.7 parts of product. Its method of preparation and elemental analysis showed that the product was tris(N,N-dimethyl-N'-methyluriedo)methylsilane as follows. Theor. (percent): carbon 45.1; hydrogen 8.67; nitrogen 24.3; silicon 8.12. Found (percent): carbon 43.5; hydrogen 8.03; nitrogen 23.77; silicon 7.81.

EXAMPLE 3

There was slowly added 14.6 parts of bis(dimethylamino)dimethylsilane to 17.1 parts of methylisocyanate dissolved in 17 parts of dry tetrahydrofuran. During the addition, the temperature rose from 24° C. to 40° C. After the addition, the mixture was maintained at a temperature between 30° C.–35°C. for one hour. The mixture was then stripped of tetrahydrofuran at temperatures between 45° C. to 49° C. at about 0.1 mm. Hg over a period of 6 hours. There was obtained 31.1 parts of product. Based on method of preparation and elemental analysis, the product was bis(N,N-dimethyl-N'-methyluriedo)dimethylsilane. For example, elemental analysis showed as follows. Theor. (percent): carbon 46.1; hydrogen 9.23; nitrogen 21.6; silicon 10.8;. Found (percent): carbon 44.65; hydrogen 8.66; nitrogen 21.85; silicon 8.72.

EXAMPLE 4

There was slowly added 79 parts of bis(dimethylamino)ethylvinylsilane to 35.7 parts of methylisocyanate dissolved in 70 parts of ether. During the addition, the temperature rose from 27° C. to 35° C. The mixture was then stripped under reduced pressure over a period of several hours. There was obtained 136 parts of product. Elemental analysis for bis(N,N-dimethyl-N'-methyluriedo)methylvinylsilane showed as follows. Theor. (percent): carbon 48.5; hydrogen 8.82; nitrogen 20.6; silicon 103. Found (percent); carbon 46.5; hydrogen 8.35; nitrogen 20.28; silicon 8.82.

EXAMPLE 5

There was added 17.5 parts of tri(dimethylamino)methylsilane to 36.6 parts of phenylisocyanate dissolved in 105 parts of dry ethylether. During the addition the temperature rose from 24° C. to 42° C. There was obtained 53.2 parts of product after the solvent was stripped under reduced pressure. Elemental analysis for tris(N,N-dimethyl-N'-phenyluriedo)methylsilane showed as follows. Theor. (percent): carbon 63.2; hydrogen 6.77; nitrogen 15.79; silicon 5.28. Found (percent): carbon 63.68; hydrogen 7.16; nitrogen 13.89; silicon 4.5.

EXAMPLE 6

There was added 26.4 parts of bis(dimethylamino)methylsilane to 34.2 parts of methylisocyanate dissolved in 71 parts of ethyl ether. During the addition, the temperature rose from 23° to 37° C. The mixture was then stripped for four hours under reduced pressure at a temperature between 42° C. to 60° C. There was obtained 56 parts of product. Its infra-red spectrum showed the presence of silicon hydride. Based on method of preparation, the product was bis(N,N-dimethyl-N'-methyluriedo)methylsilane.

EXAMPLE 7

There was added 32.2 parts of tris(dimethylamino)silane to 45.6 parts of methylisocyanate dissolved in 140 parts of dry ethylether. The temperature of the reaction was controlled by the use of a water bath. During the addition, the temperature rose from 23° C. to 30° C. A heavy white precipitate was obtained. The ether solution was decanted from the precipitate which was washed further. The product was then stripped of solvent at a temperature of 30° C. under reduced pressure. There was obtained 20.2 parts of a liquid whose infra-red spectrum showed silicon hydride and dimethyluriedo attached to silicon. Based on its infra-red spectrum and method of preparation, the product was tris(N,N-dimethyl-N'-methyluriedo)silane.

EXAMPLE 8

There was added slowly under substantially anhydrous conditions, 11.6 parts of tris(dimethylamino)tert-butoxysilane to 11.4 parts of methylisocyanate dissolved in 50 parts of anhydrous ether. During the addition, the temperature varied from 22.5° C. to 28° C. After the addition was complete, the mixture was stirred for one hour. The mixture was then stripped of ether and excess methylisocyanate at a temperature to 50° C. under reduced pressure. There was obtained 15 parts of product. Based on its infra-red spectrum and method of preparation, the product was tris(N,N-dimethyl-N'-methyluriedo)tert-butoxysilane. Its identity was further established by elemental analysis which showed as follows. (Theor. (percent): carbon 47.6; hydrogen 8.92; nitrogen 20.8; silicon 6.96. Found (percent): carbon 49.19; hydrogen 9.94; nitrogen 20.14; silicon 9.72.

EXAMPLE 9

There was slowly added under substantially anhydrous conditions, 6 parts of tris(isopropylamino)phenylsilane to a solution of 7.1 parts of allylisocyanate dissolved in 22 parts of tetrahydrofuran. During the addition, the temperature rose to 45° C. The mixture was stirred continuously for 8 hours at 25° C. and then heated for an additional five hours at 50° C. The reaction mixture was then stripped of solvent under reduced pressure to a constant weight at a bath temperature of 50° C. A quantitative yield of product was obtained. Based on its infra-red spectrum and method of preparation, the product was tris(N-isopropyl-N'-allyluriedo)phenylsilane.

EXAMPLE 10

There was added 30.8 parts of 1,4-bis[(isopropylamino)dimethylsilyl]benzene to solution of 24.9 parts of allylisocyanate dissolved in 45 parts of tetrahydrofuran. During the addition, the temperature rose from 25° C. to 45° C. The reaction was maintained at room temperature overnight then at 50° C. for an additional five hours. The mixture was stripped under reduced pressure. Based on its method of preparation and infra-red spectrum, the resulting product was 1,4-bis[N-isopropyl N'-allyluriedodimethylsilyl]benzene.

EXAMPLE 11

There was added 12.3 parts of 1,3-bis[(dimethylamino)dimethylsilyl]propane to a solution of 12.5 parts of allylisocyanate dissolved in 45 parts of tetrahydrofuran. During the addition, the temperature rose to 45° C. After the addition, the reaction was held at 50° C. for one hour. The reaction product was then stripped of solvent to a constant weight. Based on its method of preparation and infrared spectrum the product was 1,3-bis[(N,N-dimethyl-N'-allyluriedo)dimethylsilyl]propane.

EXAMPLE 12

There was added under substantially anhydrous conditions, 0.075 part of bis(N,N-dimethyl-N'-methyluriedo)dimethylsilane to 20 parts of a silano-terminated polydimethylsiloxane having a viscosity of about 3,000 centipoises at 25° C. The addition was performed at a temperature of about 50° C., during which time the mixture was stirred rapidly. An additional 0.1 part of the silane was added to the mixture after it had been stirred for about 2 hours. There was then added an additional 0.03 part of the silane to the mixture wich was stirred for 3 more hours. A gum was obtained having an intrinsic viscosity at 25° C. to toluene of 1.1 dl./g. The gum was compounded into a 20 mil sheet with 40 parts of fumed silica and 5.6 parts by weight of the mixture of benzoylperoxide. Slabs were cut from a milled sheet of the resulting composition and were press-cured 15 minutes at 300° F., and post cured for 8 hours at 390° F. The physicals were 758 p.s.i. tensile, and a 250 percent elongation.

EXAMPLE 13

In accordance with the procedure of Example 12, there was added 0.31 part of bis(N,N-dimethyl-N'-methyluriedo)methylvinylsilane to 60 parts of the silanol-terminated polydimethylsiloxane at a temperature of 80° C. The addition was performed under substantially anhydrous conditions utilizing a nitrogen blanket while the mixture was stirred rapidly. After 2 hours of stirring an additional 0.15 part of the silane was added. After an additional 10 minutes a polydimethylsiloxane gum was obtained having chemically combined methylvinylsiloxy units. It had an intrinsic viscosity in toluene of 2.33 dl./g. at 25° C.

EXAMPLE 14

There was added 0.09 part of 1,4-bis[(N-isopropyl-N'-allyluriedo)dimethylsilyl]benzene to 40 parts of a silanol-terminated polydimethylsiloxane having a viscosity of about 2500 centipoises at 25° C. During the addition, the mixture was rapidly stirred and maintained at a temperature of about 80° C. under substantially anhydrous conditions. Additional 0.09 part of the 1,4-bis(uriedo-silyl)benzene was added. Additional 0.09 increments were added 2 hours, 4½ hours, and 5 hours later. A polydimethylsiloxane gum was obtained having chemically combined dimethylsilylphenylenedimethylsiloxy units. It had an intrinsic viscosity in toluene at 25° C. of 4.75 dl./g. There was compounded, 14 parts of the gum with 1.4 parts of fumed silica and 0.28 part of benzoylperoxide utilizing a rubber mill. Slabs obtained from a milled sheet were press cured for 15 minutes at 300° F. and post cured for 8 hours at 390° F. There was obtained a rubber having valuable insulating properties.

EXAMPLE 15

There was added to 40 parts of a silanol-terminated polydimethylsiloxane utilized in Example 1, 0.09 part of 1,3 - bis[(N,N - dimethyl N' - allyluriedo)dimethylsilyl]-propane. During the addition, the mixture was stirred rapidly and maintained under substantially anhydrous conditions at 80° C. Eight additional 0.09 increments of the aforementioned 1,3 - bis(uriedosilyl)propane were added at approximately two hour intervals. There was then added an additional 1.8 part of the 1,3-bis(uriedo-silyl)propane. The mixture was then stirred for an additional 8 hours and then 2 additional increments of 0.09 part of the 1,3-bis(uriedosilyl)propane were added over 1 hour intervals. A gum was obtained having an intrinsic viscosity in toluene of 2.2 dl./g. at 25° C. Based on its method of preparation, the gum consisted essentially of chemically combined dimethylsiloxy units and dimethyl-silylpropylenedimethylsiloxy units. A blend of 14 parts of the gum, 2.8 part of fumed silica and 0.28 part of benzoyl-peroxide was made. Slabs were press cured for 15 minutes at 350° F. and press cured for 8 hours at 390° F. An elastomer was obtained which exhibited valuable insulating properties.

While the foregoing examples have of necessity been limited to only a few of the very many variables within the scope of the present invention, it should be understood that the present invention is directed to a much broader class of uriedosilanes, as shown by Formula 1 and bis(uriedosilyl)hydrocarbons of Formula 2, where R is preferably selected from monovalent hydrocarbon radicals and halogenated monovalent hydrocarbon radicals.

What I claim as new and desire to secure by Letters Patent of the United States is:

1. Uriedo-substituted organosilicon materials selected from the class consisting of uriedo silanes of the formula:

$$R_aR'''_bSiY_{4-a-b}$$

and bis(uriedosilyl)hydrocarbons of the formula:

where Y is a uriedo radical of the formula

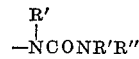

R is a member selected from the class consisting of monovalent hydrocarbon radicals, halogenated monovalent hydrocarbon radicals, and cyanoalkyl radicals, R' is a member selected from the class consisting of monvalent hydrocarbon radicals and halogenated monovalent hydrocarbon radicals, R'' is a member selected from the class consisting of hydrogen, and R' radicals, R''' is a member selected from the class consisting of hydrogen and alkoxy radicals, G is a divalent hydrocarbon radical, $a$ is a whole number of 0 to 1 inclusive, $b$ is equal to 1, and the sum of $a$ and $b$ is equal to 1 or 2, $c$ is a whole number equal to 0 to 2 inclusive, $d$ is a whole number equal to 0 to 2 inclusive, and the sum of $c$ and $d$ is equal to 0 to 4 inclusive.

2. A bis(uriedo)silane in accordance with claim 1, of the formula:

$$R_eR'''_fSiY_2$$

where Y is a uriedo radical of the formula

R is a member selected from the class consisting of monovalent hydrocarbon radicals, halogenated monovalent hydrocarbon radicals, and cyanoalkyl radicals, R' is a member selected from the class consisting of monovalent hydrocarbon radicals and halogenated monovalent hydrocarbon radicals, R'' is a member selected from the class consisting of hydrogen and R' radicals, R''' is a member selected from the class consisting of hydrogen and alkoxy radicals, $e$ is equal to 1, and $f$ is 1.

3. Compound of claim 2 wherein R and R' are alkyl and R''' is ethoxy.

4. Compound of claim 2 wherein R and R' are methyl and R''' is t-butoxy.

5. Compound of claim 2 wherein R and R' are ethyl and R''' is hydrogen.

6. A tris(uriedo)silane in accordance with claim 1 of the formula:

$$QSiY_3$$

wherein Q is alkoxy, Y is a uriedo radical of the formula

R' is a member selected from the class consisting of monovalent hydrocarbon radicals, and halogenated monovalent hydrocarbon radicals, and R'' is a member selected from hydrogen and R' radicals.

7. Tris(N,N - dimethyl - N' - methyluriedo)tert - butoxysilane, in accordance with claim 6.

8. A bis[diorganosilyluriedo]hydrocarbon in accordance with claim 1, of the formula:

$$[YR_2Si]_2G$$

where R is a member selected from the class consisting of monovalent hydrocarbon radicals, halogenated monovalent hydrocarbon radicals, and cyanoalkyl radicals, Y is a uriedo radical of the formula

R' is a member selected from the class consisting of monovalent hydrocarbon radicals and halogenated monovalent hydrocarbon radicals, R'' is a member selected from hydrogen and R' radicals, and G is a divalent hydrocarbon radical.

9. 1,4 - bis[N, isopropyl - N' - allyluriedododimethylsilyl]-benzene, in accordance wtih claim 8.

10. 1,3 - bis[N,N - dimethyl - N' - allyluriedo)dimethylsilyl]propane, in accordance with claim 8.

References Cited

UNITED STATES PATENTS

| | | | |
|---|---|---|---|
| 3,032,528 | 5/1962 | Nitzsche et al. | 260—46.5 |
| 3,109,826 | 11/1963 | Smith | 260—46.5 XR |
| 3,135,777 | 6/1964 | Nielsen | 260—448.2 |
| 3,189,576 | 6/1965 | Sweet | 260—46.5 |
| 3,346,609 | 10/1967 | Klebe | 260—448.2 |
| 3,361,783 | 1/1968 | Fink | 260—448.2 |
| 3,369,006 | 2/1968 | Brown | 260—448.2 XR |

TOBIAS E. LEVOW, Primary Examiner

PAUL F. SHAVER, Assistant Examiner

U.S. Cl. X.R.

260—46.5, 448.8